Figure 9:
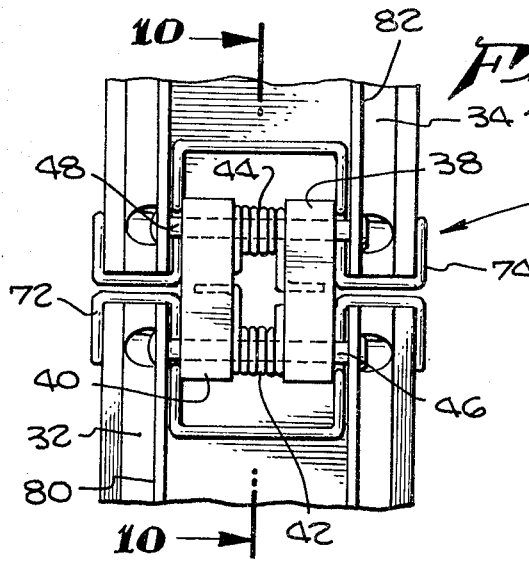

United States Patent [19]

Mahoff

[11] 4,249,786

[45] Feb. 10, 1981

[54] FLEXIBLE COUPLING

[75] Inventor: George A. Mahoff, Buena Park, Calif.

[73] Assignee: Hydraflow Supply, Inc., Cerritos, Calif.

[21] Appl. No.: 957,652

[22] Filed: Nov. 3, 1978

[51] Int. Cl.² .............................................. H01R 3/04
[52] U.S. Cl. .................................. 339/15; 174/94 S; 285/233; 285/373; 24/24
[58] Field of Search ............... 285/373, 233, 234, 365, 285/407, 408, 409, 419; 24/270, 271, 272, 273, 69 AT, 68 BT, 715, 73 MH, 24; 339/15; 174/78, 94 S

[56] References Cited

U.S. PATENT DOCUMENTS

| | | | |
|---|---|---|---|
| 3,114,164 | 7/1964 | Mayrath | 24/270 X |
| 3,186,739 | 6/1965 | Mahoff et al. | 285/223 X |
| 3,737,144 | 6/1973 | Duncan | 285/373 X |
| 3,753,205 | 8/1973 | Juger | 339/15 |
| 3,776,579 | 12/1973 | Gale | 285/233 |
| 3,891,291 | 6/1975 | Nadsudy et al. | 339/15 |
| 3,999,825 | 12/1976 | Cannon | 339/15 |
| 4,008,937 | 2/1977 | Filippi | 285/409 X |

OTHER PUBLICATIONS

Gamah Drawing, J40000, C40200

Primary Examiner—Dave W. Arola

[57] ABSTRACT

A fixed cavity, integral bonded, flexible coupling for joining ferrule terminated tubing ends in an aircraft environment in which a clam shell coupling is spring loaded at its hinges so as to bias it toward an open configuration. The clam shell coupling latches in a closed configuration by means of a plurality of latch pawls engaging latch pins, with the latch pawls being spring-biased into engagement with the latch pins.

4 Claims, 13 Drawing Figures

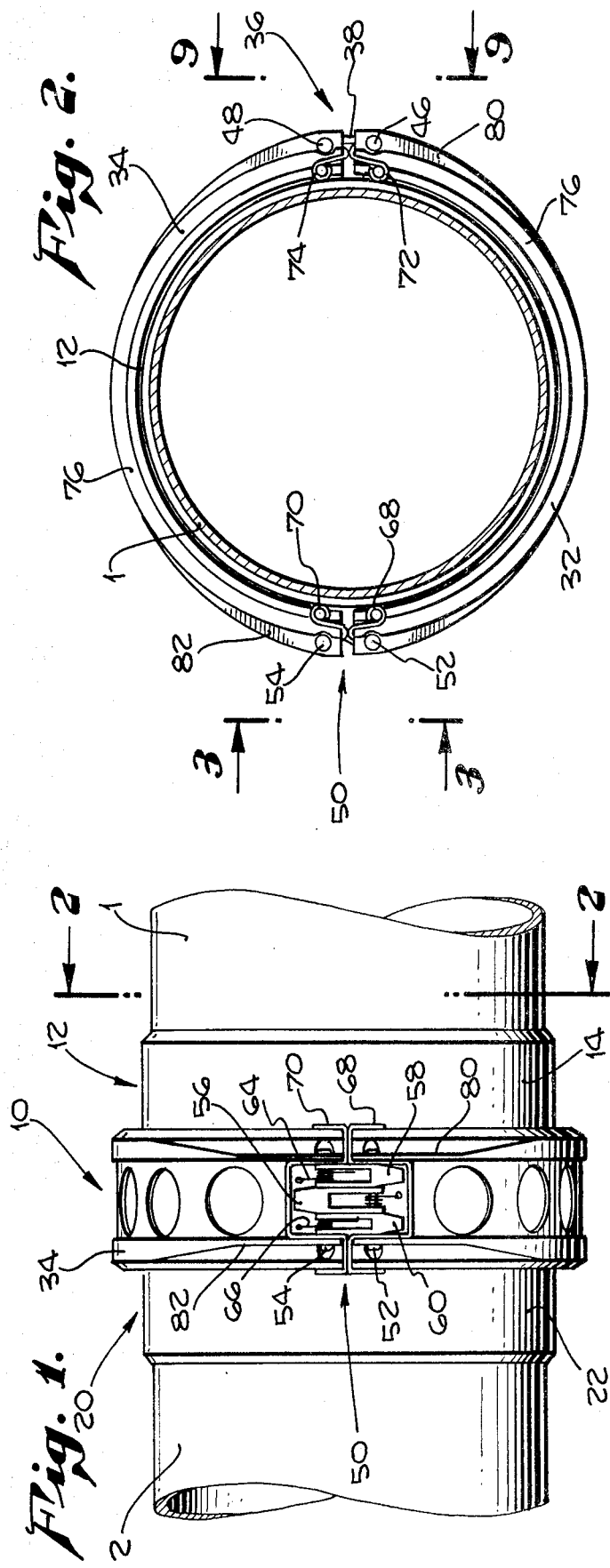
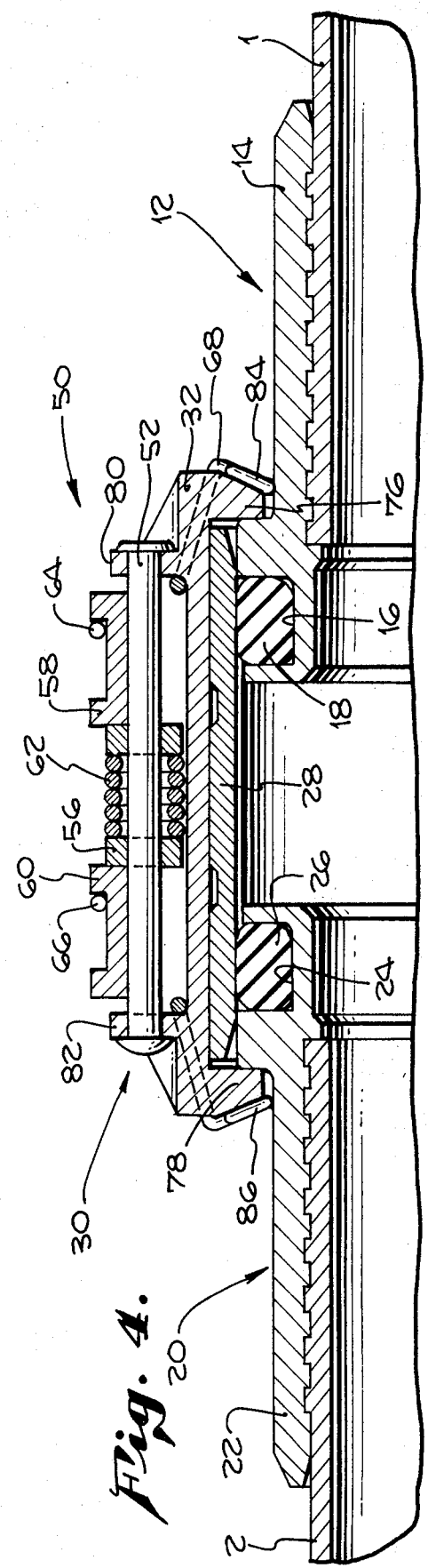

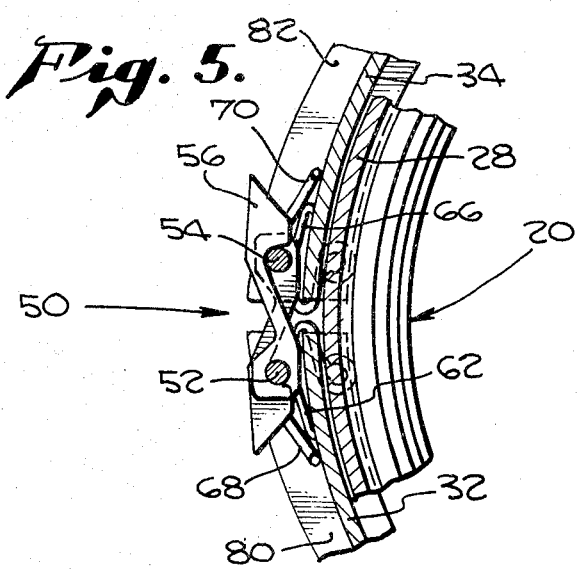
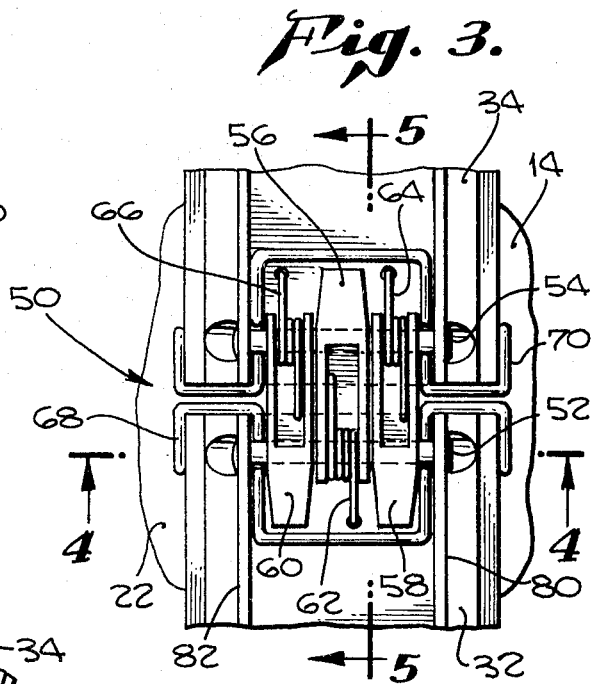
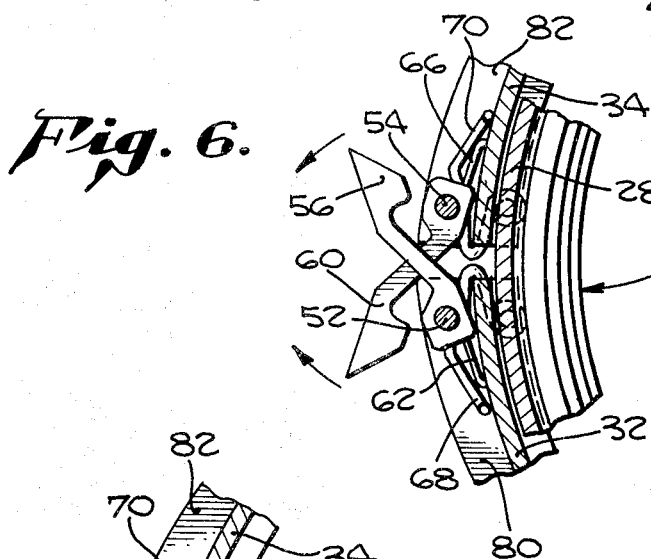
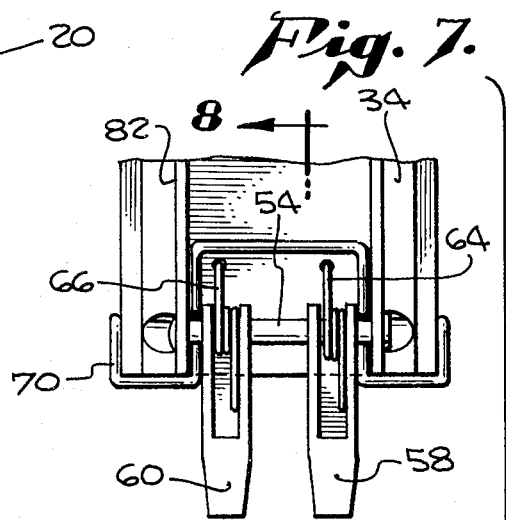
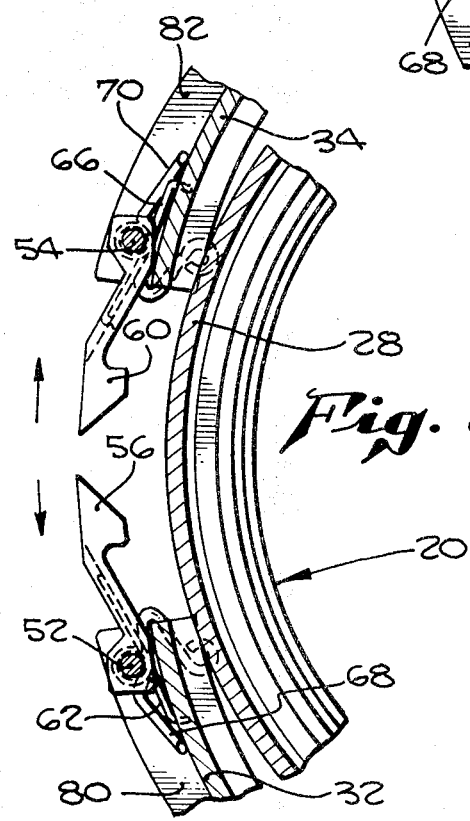
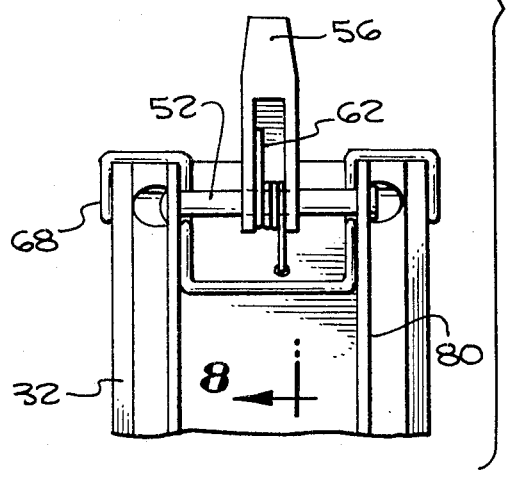

FLEXIBLE COUPLING

This invention relates to flexible couplings for use in an aircraft environment and more particularly to extremely safe, lightweight flexible couplings for connecting tubing ends in aircraft fluid systems.

Aircraft fluid systems require numerous couplings for purposes of installing and repairing various aircraft systems and structures. Couplings which are intended for use in aircraft systems must be safe, reliable and lightweight. Previously considerable difficulty had been experienced in achieving optimum levels of safety and reliability while at the same time utilizing a very lightweight coupling. These and other disadvantages of the prior art have been overcome according to the present invention.

According to the present invention, a clam shell coupling assembly is provided which is safe, reliable and lightweight and is conveniently described as a fixed cavity, integral bonded, flexible coupling. The coupling includes ferrule terminated tubing ends which are provided with o-ring carrying grooves and a sealing sleeve which cooperates with and surrounds the o-rings so as to provide a seal. The sleeve and o-ring bearing portions of the ferrules are closed and confined within a clam shell coupling element. The clam shell coupling element includes two semicircular segments which are hinged together at one pair of adjacent ends. The other pair of adjacent ends is provided with interlocking latch pawls and latch pins so as to latch the two semicircular segments together into a continuous annular closure member. The hinge is spring-biased so as to force the clam shell closure element into the normally open configuration. The latch pawls are spring biased toward engagement with the respective latch pins. Short radially extending flanges or shoulders project upwardly from the closure element and extend circumferentially of the closure elements. The hinge components and the latching components are nested substantially entirely within the recess defined by these outwardly radially extending flanges so as to protect them from accidental damage. It is very important, particularly in aircraft fuel systems, that all of the fuel lines be thoroughly grounded throughout the entire system. In order to insure this electrical grounding, bonding springs are provided which bridge from one ferrule to the other through the flexible coupling. The bonding springs are integral with the clam shell closure element.

Previous expedients include Cannon U.S. Pat. No. 3,999,825 wherein closure of a clam shell coupling element is accomplished with a single over-the-center latch mechanism with a detent or secondary lock member engageable in the latched configuration.

The flexible coupling according to the present invention is a very safe, reliable, lightweight coupling which is particularly suited for use in aircraft fluid systems and in particular aircraft fuel systems. Fluid couplings according to the present invention are easy to install, easy to inspect and cannot be installed improperly. These devices can be installed with one hand where necessary in crowded or inaccessible locations. If the clam shell closure member is not fully closed, the latch pawls will not engage the respective latch pins and the hinge spring will force the closure member to its full open configuration. Visual or tactile inspection will immediately reveal that the closure member is not in place around the sleeve and ferrule elements of the flexible coupling. If the clam shell closure member is misaligned around the ferrule or sleeve elements, it cannot be fully closed and will spring open as soon as it is released by the workman who is attempting to install it. The coupling has a low profile and the latching members are shielded from accidental damage by being nested between radially extending flanges on the closure member. Aircraft components are frequently subjected to severe shock and vibration. The combination of the spring-bias of the latching pawls with the latch pins and the spring-biased hinge for the coupling member tend to secure the pawls tightly in the latched configuration. The possibility of accidental uncoupling due to shock or vibration is thus guarded against. The spring-loading of the pawls also permits the clam shell closure member to latch when squeezed together into the closed configuration without any necessity for touching the latching pawls themselves. Even if one of the latching pawls is accidentally lifted while working around the coupling, it is highly unlikely that the other pawls would be lifted simultaneously because the unlatching of the coupling requires movement in opposite directions simultaneously. If one pawl is accidentally lifted out of engagement with the respective latch pin, it will drop back into engagement as soon as it is released.

The integral bonding springs according to the present invention are configured so that it is very difficult to damage them through mishandling or misuse while the coupling is in the open configuration. In the closed configuration the bonding springs are positioned adjacent to the clam shell coupling member in such a location that accidental damage or disengagement is very unlikely.

Figure 10:
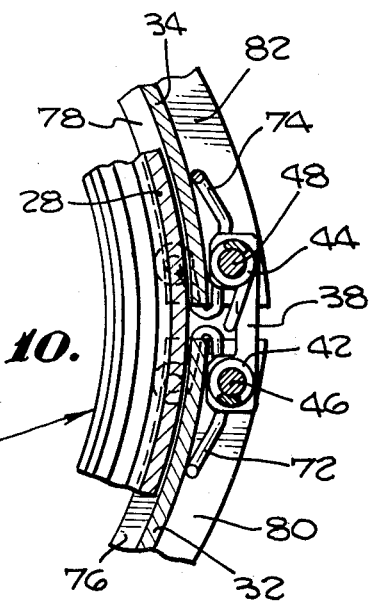
Figure 11:
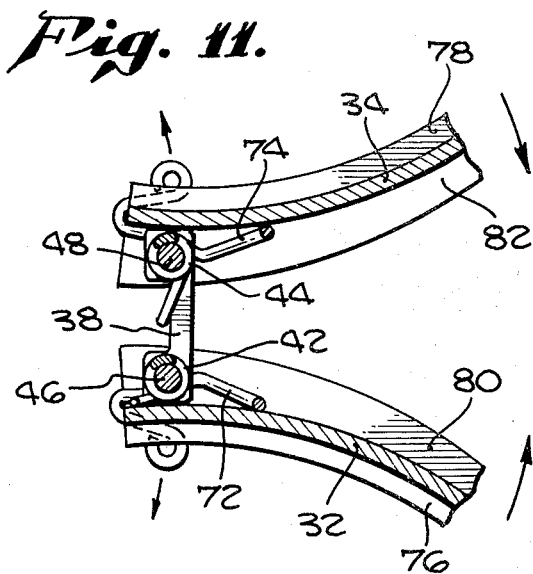
Figure 12:
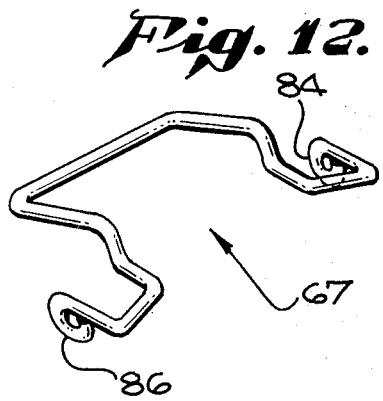
Figure 13:
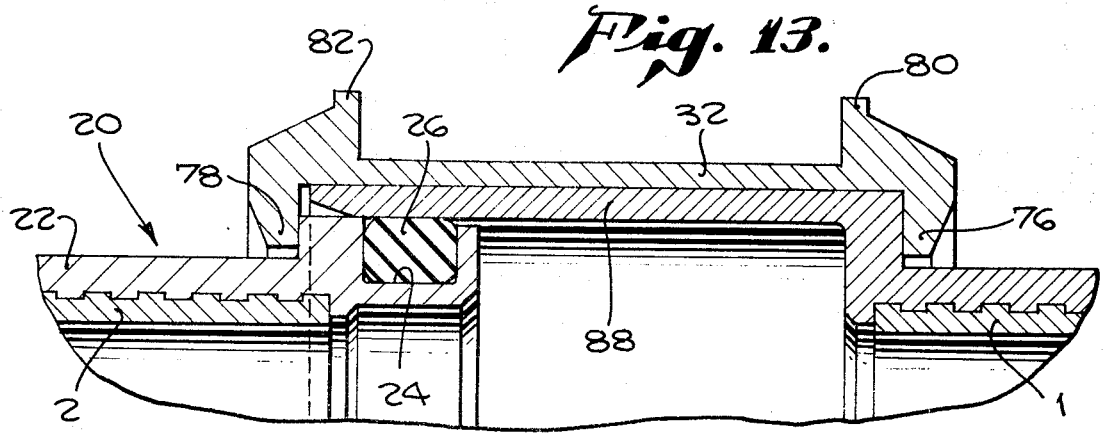

In the drawings there is illustrated for the purpose of illustration only and not limitation:

FIG. 1, a front elevational view of a flexible coupling according to the present invention;

FIG. 2, a cross-sectional view taken along line 2—2 of FIG. 1;

FIG. 3, an enlarged view of the latch mechanism taken along line 3—3 of FIG. 2;

FIG. 4, a cross-sectional view taken along line 4—4 in FIG. 3;

FIG. 5, a cross-sectional view taken along line 5—5 in FIG. 4;

FIG. 6, a cross-sectional view similar to FIG. 5 showing the latch pawls in the disengaged configuration;

FIG. 7, a view similar to FIG. 3 showing the latch mechanism disengaged and the coupling member partially open;

FIG. 8, a cross-sectional view taken along line 8—8 of FIG. 7;

FIG. 9, an enlarged view of the hinge mechanism taken along line 9—9 of FIG. 2;

FIG. 10, a cross-sectional view taken along line 10—10 of FIG. 9;

FIG. 11, a cross-sectional view similar to FIG. 10 showing a clam shell closure member in the fully open configuration;

FIG. 12, a perspective view of an electrical bonding spring according to the present invention; and FIG. 13, a cross-sectional view similar to FIG. 4 of an additional embodiment according to the present invention.

Referring particularly to the drawings, there is illustrated first tube 1 and second tube 2 which are joined together in a flexible fluid type coupling by means of a flexible coupling indicated generally at 10. Flexible coupling 10 includes a first tubing end 12 which includes first ferrule 14. First ferrule 14 includes a fixed cavity o-ring groove 16. An o-ring indicated at 18 is positioned in operative position within the radially outwardly opening groove 16. Second tubing end 20 includes a second ferrule 22 which is similar to first ferrule 14. A fixed cavity o-ring groove 24 opens radially outwardly and receives o-ring 26 therewithin. O-rings 18 and 26 cooperate with the cylindrical radially inner wall of sleeve 28 to form a fluid-tight seal which permits translational, rotational and angular adjustment within limited parameters of tubes 1 and 2 with respect to one another.

The ferrules 14 and 22 and sleeve 28 are confined together by means of a clam shell coupling assembly 30 which includes a first semicircular segment 32 and a second semicircular segment 34. The semicircular segments are hinged together at the peripherally adjacent ends by hinge assembly 36. Hinge assembly 36 includes a first hinge plate 38 and a second hinge plate 40. First and second bias springs 42 and 44, respectively, are provided so as to bias the semicircular segments 32 and 34 into the fully open configuration indicated in FIG. 11. First bias spring 42 is mounted on first hinge pin 46 and second bias spring 44 is mounted on second hinge pin 48. The hinge plates 38 and 40 are likewise mounted on hinge pins 46 and 48.

A latch assembly indicated generally at 50 acts to retain the clam shell coupling assembly 30 in the closed configuration. Latch assembly 50 includes a first latch pin 52 and a second latch pin 54. A first latch pawl 56 is pivotally mounted on first latch pin 52. A second latch pawl 58 is pivotally mounted on second latch pin 54. Likewise, a third latch pawl 60 is pivotally mounted on latch pin 54. Thus the latch pins 52 and 54 both serve the dual function of pivotally supporting at least one latch pawl while cooperating with at least one other latch pawl to retain the clam shell coupling assembly 30 in the closed configuration. The latch pins 52 and 54 are mounted on adjacent ends of semicircular segments 32 and 34 with the latch pawls 56, 58 and 60 extending between the two semicircular segments to form an interlocking latch mechanism. First latch pawl 56 is biased toward engagement with second latch pin 54 by first latch spring 62. Likewise, second latch pawl 58 and third latch pawl 60 are biased toward engagement with first latch pin 52 by the urging of second and third latch springs 64 and 66, respectively.

Electrical bonding is provided from first tube 1 through flexible coupling 10 to second tube 2 by means of bonding springs. A typical bonding spring is indicated generally at 67 in FIG. 12. Four bonding springs are provided as indicated at 68, 70, 72 and 74, respectively. Semicircular segments 32 and 34 are provided with inwardly extending radial flanges 76 and 78 which cooperate with a radially extending shoulder on each of ferrules 14 and 22 so as to confine the flexible coupling together in operative configuration. Radial flanges 80 and 82 extend outwardly and serve to mount the respectively hinge and latch pins as well as to shield the hinge assembly 36 and latch assembly 50 from accidental damage.

Bonding spring 67 is configured so that one end of the wire spring is curled into an eyelet 84. The opposite end of the spring is likewise curled into an eyelet 86. Each end of the semicircular segments 32 and 34 is provided with a bonding spring 67. The eyelets project outwardly beyond the shoulders or flanges 76 and 78 and downwardly therefrom so as to engage firmly with ferrules 14 and 22 when the clam shell coupling assembly is in the closed configuration. The bonding springs are held in position by the respective hinge and latch pins. In the closed configuration of the clam shell coupling 30, the eyelets 84 and 86 are positioned closely adjacent to the respective flanges or shoulders 76 and 78 so they are protected from accidental damage and disengagement.

Referring particularly to FIG. 13, an alternative embodiment is illustrated in which a sleeved ferrule 88 is employed so that only one o-ring is used. The sleeve is integral with the ferrule in this embodiment, The clam shell coupling assembly for this embodiment is interchangeable with that of the embodiment illustrated in FIGS. 1 through 12.

As will be understood by those skilled in the art, what has been described are preferred embodiments in which modifications and changes may be made without departing from the spirit and scope of the accompanying claims.

What is claimed is:

1. In a fixed cavity, integral bonded, flexible coupling for joining ferrule terminated tubing end means in an aircraft, a clam shell coupling means for releasably encircling the outer dimensions of said tubing end means and joining said tubing end means together in flexible sealed relationship, said clam shell coupling means including two semicircular segments hingedly joined together for movement between open and closed configurations; spring means for biasing said segments toward said open configuration; and means for latching said segments together in said closed configuration, said means for latching including a first latch pin carried by a first of said segments and a second latch pin carried by a second of said segments, at least one latch pawl pivotally mounted on each of said latch pins, a latch pawl pivotally mounted on said first latch pin being engageable with said second latch pin and a latch pawl pivotally mounted on said second latch pin being engageable with said first latch pin, said latch pawls being spring biased toward engagement with the respective latch pins.

2. A coupling of claim 1 including at least two latch pawls pivotally mounted on said first latch pin and at least one latch pawl pivotally mounted on said second latch pin.

3. A clam shell fixed cavity flexible coupling comprising:

at least one generally annular coupling element adapted to be mounted on a tubular conduit in an aircraft and including radially extending flanges defining therebetween a fixed size o-ring cavity opening radially outwardly;

a generally cylindrical sleeve element adapted to receive said flange element therewithin and including an inner cylindrical wall adapted to cooperate in a sealing relationship with an o-ring mounted in said o-ring cavity;

a clam shell closure means having a generally annular closed configuration for retaining said coupling element and cylindrical sleeve element together in cooperative sealing relationship and an open configuration for releasing said coupling element and cylindrical sleeve element, said clam shell closure means including at least two hingedly connected arcuate segments, said arcuate segments being spring-biased to cause said clam shell closure means to assume said open configuration;

means for latching together adjacent first and second arcuate segments of said clam shell closure means to hold said clam shell closure means in said closed configuration, said means for latching including a plurality of latch pawls and a plurality of latch pins engageable by said latch pawls, said latch pawls being spring-biased toward engagement with said latch pins, each of said first and second arcuate segments having at least one latch pawl and at least one latch pin mounted thereon.

4. In an aircraft fluid system, a fixed cavity, integral bonded, flexible coupling for joining ferrule terminated tubing end means in an aircraft, a clam shell coupling means for releasably encircling the outer dimensions of said tubing end means and joining said tubing end means together in flexible sealed relationship, said clam shell coupling means including at least two arcuate segments hingedly joined together for movement between open and closed configurations; spring means for biasing said segments toward said open configuration; and means for latching said segments together in said closed configuration, said means for latching including a plurality of latch pawls and a plurality of latch pins engageable by said latch pawls, said latch pawls being spring-biased toward engagement with said latch pins, adjacent ones of said arcuate segments having at least one latch pawl and at least one latch pin mounted thereon.

* * * * *